Patented May 24, 1927.

1,630,143

UNITED STATES PATENT OFFICE.

ELIZABETH J. SULLIVAN, OF MINNEAPOLIS, MINNESOTA.

FLOUR IMPROVER.

No Drawing.  Application filed August 26, 1926. Serial No. 131,819.

This invention relates to a novel and economical flour improver and yeast nutrient which is particularly adapted for use with flour in baking bread and bread like food products.

Freshly milled flour naturally is slightly acid in character; that is, it has a certain degree of hydrogen ion concentration. Various flours differ in their degree of acidity due largely to differences in the various types of grains used and in the various milling processes used. After freshly milled flour has stood for a considerable length of time, it is found that a certain further degree of hydrogen ion concentration will take place, thereby slightly increasing the acid content of the flour. The acid content of flour will accordingly vary considerably according to the length of time it has stood after being milled. It has been found in making bread that the acidity of the dough will vary considerably due to variations of the alkalinity of various waters used or in variations of the acidity or alkalinity of the other ingredients making up the dough.

The chief concern of bread makers is to obtain a dough which will have a large "kick", "pop" or "spring" in the oven, that is, a high degree of expansibility as it is heated. It has been found that the amount of "kick", "pop" or "spring" in dough varies largely with the degree of hydrogen ion concentration of the dough, that is, the acidity of the dough—the greater hydrogen ion concentration in the dough, the greater will be the activity of the yeast, accordingly the greater will be the amount of carbon dioxide released when the dough is in the oven and the greater will be the spring of the dough. It has also been found that all flour and the dough made therefrom has what is known as an optimum acidity, that is a certain high point of acid concentration beyond which no further beneficial results will accrue by further increasing the hydrogen ion concentration of the dough. Dough reaching this optimum acidity will permit the greatest activity of the yeast and accordingly the greatest spring in the oven will be obtained from dough made from such flour.

It is, therefore, an object of this invention to provide a flour improver which will bring all flour or dough mixed therefrom to or close to the optimum acidity, whereby bread making may be more nearly standardized, no matter what flour is used, what length of time the flour has stood after milling or what acidity the ingredients making up the dough may have.

It is a further object to provide such a flour improver which will be cheap to produce and may be readily mixed with flour or flour dough.

Yet another object is to provide such a flour improver which will act as a yeast nutrient, will aid in properly maturing and conditioning the gluten in the flour, will increase absorption of the dough and produce an improved bread having a high nutrient value at a lower cost than the bread now being made.

These and other objects and advantages will be more fully set forth below and in the appended claims forming a part of this specification.

The formula for my flour improver is substantially as follows: 50% monocalcium dihydrogen phosphate (calcium acid phosphate) $Ca(H_4PO_4)_2$, 25% ammonium chloride—$NH_4CL$, 25% calcium sulphate—$CaSO_4$, .2% iron, manganese or zinc sulphate, or a mixture thereof, may be added, if desired. Variations of from 5 to 10% may be made in the proportions of any of the three main ingredients used, if desired, although the best results are obtained if the ingredients are used in approximately the proportions named.

The three main compounds, calcium acid phosphate, ammonium chloride and calcium sulphate, are mixed together and the iron manganese or zinc sulphate, or a mixture thereof, is added, if desired. Approximately from three to five ounces of the mixture are used with each hundred pounds of flour. If desired, a suitable filler, such as flour, may be mixed with the above ingredients when the same is put up.

The improver may be added to the flour either at the time it is barrelled or during the bread making process. If the "sponge" process rather than the "straight dough" process is used for making bread, the improver may be added either before or after the dough has been allowed to raise the first time as best suits the taste of the baker.

The amount of yeast used in baking when the improver is employed will remain about the same as before. Usually in bread making enough or more than enough yeast is used so that there will be sufficient yeast in the dough to fully ferment the same, and no different fermentative result would be obtained by the addition of more yeast to the dough.

The chief function of the present flour improver is to increase acidity of the flour or the dough, thereby increasing the activity of the yeast, causing an increased amount of carbon dioxide to be released, thereby increasing the spring of the dough in the oven. Calcium acid phosphate will of itself slightly increase the spring of the dough in the oven as will either ammonium chloride alone or calcium sulphate alone. The use of any of these three ingredients alone is admittedly old. The use of ammonium chloride and calcium sulphate together has also been known for some time and it has been found that by adding the two salts to the dough, an increased spring is given thereto which would not be obtained by simply increasing the proportions of either one of the two salts when used alone in the dough. Also the increased spring when both are used together is greater than the sum of the increased spring obtained by both if used individually in the same proportions. It is now found that by use of the three compounds, calcium acid phosphate, ammonium chloride and calcium sulphate together that a very marked effect is produced upon the activity of the yeast which could not be accomplished by increasing the proportions of any two of these compounds when used together alone in a given quantity of dough. In other words, if ammonium chloride and calcium sulphate were used together or if calcium acid phosphate and ammonium chloride were used together or if calcium acid phosphate and calcium sulphate were used together in a given quantity of dough, an increased spring would be given to the dough, which would not be produced if these compounds were not used. Also up to a certain point, as the amount of any two of these compounds when used together were increased, an increased spring in the dough would result. However, the amount of spring gained by using any quantity of but two of these compounds in a given amount of dough would not be nearly as great as would be the case if all three of the compounds were used together in the same batch of dough. Also it is found that a greater spring in a given batch of dough will be obtained by use of the three ingredients together in the proper amounts and proportions than the aggregate spring that would be obtained by adding the quantity of spring obtained by use of any two of the ingredients in a similar batch of dough in relatively the same amounts and proportions to the quantity of spring obtained by adding the third ingredient alone to a similar batch of dough, in relatively the same amount and proportion; that is, the three ingredients supplement each other in their action and the result obtained by use of the three is not merely aggregative of the result obtained by use of any two together and the third alone. This has been demonstrated by a large number of actual experiments conducted in the laboratory. The combination of the ammonium chloride, calcium sulphate and calcium acid phosphate produces a higher hydrogen ion concentration in the flour than has hitherto been obtained, and, accordingly, an increased activity of the yeast results. A decidedly new result is thus obtained by the combination of the three compounds. It is found that by adding a very small amount of either iron, manganese or zinc sulphate, or small amounts of a mixture made from the said sulphates with the three main ingredients that a still better effect is had upon the yeast than with the three main ingredients alone. The metal sulphate or sulphates act as a catalytic agent or agents to increase the action that the main ingredients produce in the dough.

The amount of the improver used to a fixed amount of flour is sufficient so that no further beneficial hydrogen ion concentration of the dough will occur if a greater amount of the improver is used; that is, the flour or dough made therefrom is fully or very nearly fully raised to the optimum acidity by adding the proper amount of the improver. By so bringing the flour up to this optimum acidity, variations in the acidity of the natural flour or in the water or other ingredients used in making bread will not affect the baking process. Thus by use of the flour improver, the spring in the oven of dough made from various types of flour or in which various types of water or other ingredients are used will remain the same. More uniformity in bread baked will accordingly result.

It has also been found that by the addition of the present flour improver to flour that slightly increased absorption will result in the dough made therefrom; that is, that slightly more water can be used with a given quantity of flour, thereby decreasing the cost of the bread. The nutritive value of the bread will also be improved due to the addition of valuable mineral salts thereto and to the fact that the gluten in the flour will be properly matured and conditioned. A larger volume loaf of bread will be obtained with a better taste, appearance and color.

Due to the fact that the activity of the yeast will be increased by the addition of the present improver to the bread dough, the rate of fermentation of the dough will be increased and, accordingly, there will be a saving of time in the baking process.

It will, of course, be understood that variations in the proportions of the ingredients used in the above formula may be made without departing from the scope of the present invention, which, generally stated, consists in the product above described and explained and set forth in the appended claims.

What is claimed is:

1. A flour improver consisting of calcium acid phosphate, ammonium choloride and calcium sulphate.

2. A flour improver consisting of from 40 to 60% calcium acid phosphate, 20 to 30% ammonium chloride and 20 to 30% calcium sulphate.

3. A flour improver consisting of approximately 50% calcium acid phosphate, approximately 25% ammonium chloride and approximately 25% calcium sulphate.

4. A flour improver consisting of approximately 50% calcium acid phosphate, approximately 25% ammonium chloride, approximately 25% calcium sulphate and approximately .2% of other metal sulphates.

5. A flour improver consisting of approximately 50% calcium acid phosphate, approximately 25% ammonium chloride, approximately 25% calcium sulphate and approximately .2% iron sulphate.

In testimony whereof I affix my signature.

ELIZABETH J. SULLIVAN.